United States Patent
Powley

(10) Patent No.: US 9,576,464 B2
(45) Date of Patent: Feb. 21, 2017

(54) METHODS AND SYSTEMS FOR PROVIDING ALERTS IN RESPONSE TO ENVIRONMENTAL SOUNDS

(71) Applicant: EchoStar UK Holdings Limited, Steeton (GB)

(72) Inventor: Mark Powley, Skipton (GB)

(73) Assignee: EchoStar UK Holdings Limited, Steeton (GB)

(*) Notice: Subject to any disclaimer, the term of this patent is extended or adjusted under 35 U.S.C. 154(b) by 179 days.

(21) Appl. No.: 14/526,125

(22) Filed: Oct. 28, 2014

(65) Prior Publication Data
US 2016/0117905 A1    Apr. 28, 2016

(51) Int. Cl.
| | | |
|---|---|---|
| G08B 21/18 | (2006.01) | |
| H04N 21/478 | (2011.01) | |
| H04R 1/08 | (2006.01) | |
| G08B 1/08 | (2006.01) | |

(52) U.S. Cl.
CPC ............... *G08B 21/18* (2013.01); *G08B 1/08* (2013.01); *H04N 21/478* (2013.01); *H04R 1/08* (2013.01); *H04R 2499/15* (2013.01)

(58) Field of Classification Search
CPC ............ G08B 21/18; G08B 1/08; G08B 5/00; G08B 13/00; G08B 21/00; G08B 25/00; H04R 1/08; H04R 2499/15; H04N 21/478; H04N 21/20; H04N 21/27; H04N 21/40
USPC .... 340/500, 521, 531, 540, 3.1, 4.1, 5.1, 6.1
See application file for complete search history.

(56) References Cited

U.S. PATENT DOCUMENTS

| | | | |
|---|---|---|---|
| 6,195,004 B1 | 2/2001 | Leonowich | |
| 2007/0143820 A1* | 6/2007 | Pawlowski | G11B 27/034 725/145 |
| 2009/0100509 A1 | 4/2009 | Wolfsberger | |
| 2011/0030021 A1* | 2/2011 | Campagna | H04N 7/181 725/106 |
| 2011/0057796 A1 | 3/2011 | Candelore | |
| 2011/0206345 A1* | 8/2011 | Masuo | H04N 5/775 386/239 |
| 2012/0224706 A1* | 9/2012 | Hwang | G10L 15/10 381/56 |
| 2012/0229253 A1* | 9/2012 | Kolar | B60R 25/257 340/5.61 |
| 2015/0364137 A1* | 12/2015 | Katuri | G10L 15/20 704/233 |

FOREIGN PATENT DOCUMENTS

WO    2013/178869 A1    12/2013

OTHER PUBLICATIONS

International Search Report and Written Opinion for PCT/EP2015/073008 mailed Dec. 7, 2015, 12 pages.

* cited by examiner

*Primary Examiner* — Brian Wilson
(74) *Attorney, Agent, or Firm* — Kilpatrick Townsend & Stockton LLP

(57) ABSTRACT

Various arrangements are presented for alerting a user to household environmental sounds. Data representative of a sound may be captured using a microphone. A sound profile may be received, the sound profile may include a definition associated with the sound and an acoustic signature. A match may be identified between the data indicative of the sound recorded by the microphone and the sound profile. A message may be output to a television for visual presentation based on the definition from the sound profile identified as the match.

20 Claims, 8 Drawing Sheets

METHODS AND SYSTEMS FOR PROVIDING ALERTS IN RESPONSE TO ENVIRONMENTAL SOUNDS

BACKGROUND

From buzzing washing machines to breaking glass and barking dogs to dripping pipes, sound can be an excellent indication of the status of various objects and animals in an environment, such as a household environment. Based on such sounds, a person can take appropriate action as necessary (e.g., empty the washing machine, find the source of the broken glass, repair the pipe). Typically, sound in a home is identified by a person who happens to be in the vicinity. However, when a person is not nearby, is hard of hearing, or is otherwise distracted or prevented from hearing the sound, such sound may not serve to alert the person.

SUMMARY

Various embodiments are presented for alerting a user to household environmental sounds. Such embodiments may be in the form of methods, systems, television receivers, and computer-readable mediums. A television receiver may receive, from a microphone, data representative of a sound captured by the microphone. The television receiver may receive, from a remote computer server system, a sound profile, wherein the sound profile includes a definition associated with the sound and an acoustic signature. A match may be identified, the match having at least a threshold level of confidence, between the data indicative of the sound recorded by the microphone and the sound profile. The television receiver may output, to a television, for visual presentation to the user, a message based on the definition from the sound profile identified as the match. In some embodiments, such steps are performed by a computerized device other than a television receiver.

Such embodiments may include one or more of the follow features: At least a portion of the data indicative of the sound captured by the microphone may be transmitted to the remote computer server system, wherein identifying the match is performed by the remote computer server system. It may be determined that the data indicative of the sound captured by the microphone does not match, within the threshold level of confidence, any sound profile of a plurality of local sound profiles stored by the television receiver. Transmitting, to the remote computer server system, at least the portion of the data indicative of the sound captured by the microphone may occur in response to determining that the data indicative of the sound captured by microphone does not match any sound profile of the plurality of local sound profiles. A timestamp may be created that is indicative of a time at which the sound was captured by the microphone. The timestamp may be output for presentation concurrently with the message. A background model may be created for a household environment, the background model being indicative of background noise. The data indicative of the sound captured by the microphone may be compared with the background model. The background model may be subtracted from the data indicative of the sound captured by the microphone with the background model prior to identifying the match. Data indicative of a second sound captured by the microphone may be received. It may be determining that the remote computer server system does not store any sound profile that matches the second sound. In response to determining that the remote computer server system does not have a sound profile that matches the second sound, it may be output for presentation to the user, an interface to allow the user to identify the sound. While presenting the interface, a recording of the second sound may be output for listening by a user. A second definition of the second sound may be received from the user. The second definition of the second sound and at least a portion of the data indicative of the second sound captured by the microphone may be transmitted to the remote computer server system.

Additionally or alternatively, embodiments may include one or more of the following features: From the remote computer server system, via a television distribution network, a plurality of sound profiles may be received, wherein each sound profile comprises a corresponding message and a corresponding acoustic signature, the sound profile being part of the plurality of sound profiles. Outputting, for visual presentation to the user, the message from the sound profile identified as the match may include overlaying the message from the sound profile over television programming being output to a television for presentation by the television receiver. Outputting, for visual presentation to the user, the message from the sound profile identified as the match may include: storing an indication of the sound profile having been matched; determining that the television receiver has been turned on for viewing of the television programming; and in response to the television receiver having been turned on for viewing of the television programming, outputting, to a television, the definition from the sound profile identified as the match based on the stored indication of the sound profile. The remote computer server system may maintain a database of sound profiles storing a plurality of sound profiles, wherein one or more sound profiles of the plurality of sound profiles are based on definitions of sounds received from a plurality of television receivers.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
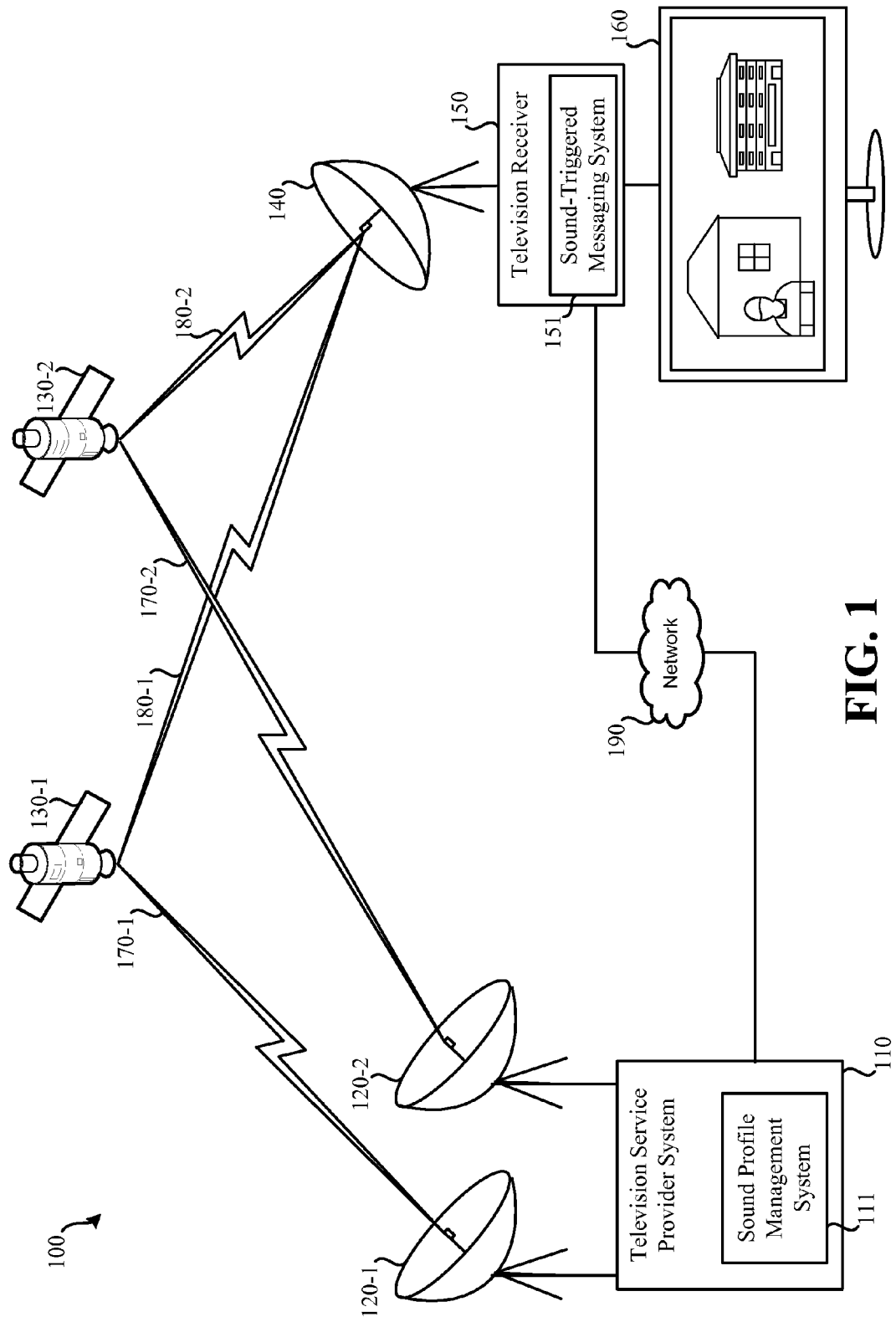
FIG. 1 illustrates an embodiment of a television distribution system having an incorporated sound profile management system.

Sound detected in an environment, such as a household environment, can be used to identify the states of various electronics, appliances, utilities, objects, people, and pets. For instance, dishwashers, washing machines, fire alarms, stereo equipment, doorbells, vacuum cleaners, dripping faucets, smashing glass, dogs barking, and crying babies all tend to create unique, identifiable sounds. A person present in a household in which such sounds are occurring can typically hear such sounds and quickly determine the source of the sound and whether the sound should be investigated. However, in some instances, the sound may not be heard by any person within the household. For instance, the household's occupants may be away from the household, may be hard of hearing, and/or there may be significant noise in the household, such as due to a television being turned on or an appliance operating.

Despite a person possibly not hearing the sound, the sound can instead be detected by one or more microphones that may be scattered throughout the household. For instance, microphones may be incorporated as part of a television, television receiver, a mobile device (e.g., cellular phone, tablet computer), remote control, and/or as a stand-alone device. Such one or more microphones may detect sounds in the environment of the household. Such sounds may be analyzed in an attempt to determine the source of the sound and the meaning of the sound. Sounds may be compared to stored sound profiles, which can be locally stored or remotely-accessed from a remote server. When a sound is identified, a message may be output for presentation to a person (referred to as a user) via a television receiver and/or mobile device. A message may be presented to the user that indicates: the type of sound detected, the time of the sound, the approximate location of the sound, and/or a message or description to accompany the sound. For instance, if the sound identified is an end-cycle sound for a dishwasher, the message may state: "In the kitchen, the dishwasher finished its washing cycle at 2:27 PM." If a television is turned on, such a message may be presented via the television, such as via an overlay over content currently being output for presentation by a television receiver. Additionally or alternatively, such as if the television is not actively outputting content from a television receiver, the message may be transmitted to and output by a mobile device of the user. In some embodiments, a log of messages is maintained by the television receiver while the television receiver is not outputting content. When the television receiver next outputs content, messages from the log may be output for presentation. Depending on an importance of a message, messages associated with various sounds may be handled differently (e.g., breaking glass may be considered a higher priority than a dryer's cycle being complete).

The embodiments detailed herein are focused on household applications. However, it should be understood that the embodiments may be adapted for other environments. For instance, similar embodiments may be used in hospitals, schools, stores, warehouses, airports, train stations, auditoriums, restaurants, fuel stations, etc. In some embodiments, the methods and systems detailed herein are functionally part of a television service provider's system; that is, a television distribution system may be used to provide one or more aspects of the sound-based messaging system. It should be understood that such embodiments may be adapted such that a television service provider system is not needed.

In some embodiments, a television service provider that distributes television programming via satellite can operate a sound-based messaging system. FIG. 1 illustrates an embodiment of a television distribution system 100 having an incorporated sound profile management system. Television distribution system 100 may include: television service provider system 110, satellite transmitter equipment 120, satellites 130, satellite dish 140, television receiver 150, and display device 160. Alternate embodiments of satellite television distribution system 100 may include fewer or greater numbers of components. While only one satellite dish 140, television receiver 150, and display device 160 are illustrated, it should be understood that multiple (e.g., hundreds, thousands, millions) instances of user equipment may receive television signals from television service provider system 110 via satellites 130.

Television service provider system 110 and satellite transmitter equipment 120 may be operated by a television service provider. A television service provider may distribute television channels (e.g., broadcast and "cable" television channels, such as FOX, FX, ESPN, NBC, and CBS), on-demand programming, programming information, and/or other content/services to users. Television service provider system 110 may receive feeds of one or more television channels from various sources. Such television channels may include multiple television channels that contain at least some of the same content (e.g., network affiliates). To distribute television channels for presentation to users, feeds of the television channels may be relayed to user equipment via multiple television distribution satellites. Each satellite may relay multiple transponder streams. Satellite transmitter equipment 120 (120-1, 120-2) may be used to transmit a feed of one or more television channels from television service provider system 110 to one or more satellites 130. While a single television service provider system 110 and satellite transmitter equipment 120 are illustrated as part of satellite television distribution system 100, it should be understood that multiple instances of transmitter equipment may be used, possibly scattered geographically, to communicate with satellites 130. Such multiple instances of satellite transmitting equipment may communicate with the same or with different satellites. Different television channels may be transmitted to satellites 130 from different instances of transmitting equipment. For instance, a different satellite dish of satellite transmitter equipment 120 may be used for communication with satellites in different orbital slots.

Satellites 130 may be configured to receive signals, such as streams of television channels, from one or more satellite uplinks such as satellite transmitter equipment 120. Satellites 130 may relay received signals from satellite transmitter equipment 120 (and/or other satellite transmitter equipment) to multiple instances of user equipment via transponder streams. Different frequencies may be used for uplink signals 170 from transponder streams 180. Each of the transponder streams transmitted by satellites 130 may contain multiple television channels transmitted as packetized data. For example, a single transponder stream may be a serial digital packet stream containing multiple television channels. Therefore, packets for multiple television channels may be interspersed.

Multiple satellites 130 may be used to relay television channels from television service provider system 110 to satellite dish 140. Different television channels may be carried using different satellites. Different television channels may also be carried using different transponders of the same satellite; thus, such television channels may be transmitted at different frequencies and/or different frequency ranges. As an example, a first and second television channel may be relayed via a first transponder of satellite 130-1. A third, fourth, and fifth television channel may be relayed via a different satellite or a different transponder of the same satellite relaying a transponder stream at a different frequency. A transponder stream transmitted by a particular transponder of a particular satellite may include a finite number of television channels, such as seven. Accordingly, if many television channels are to be made available for viewing and recording, multiple transponder streams may be necessary to transmit all of the television channels to the instances of user equipment. Each transponder stream may be able to carry a finite amount of data. As such, the number of television channels that can be included in a particular transponder stream may be at least partially dependent on the resolution of the video of the television channel. For example, a transponder stream may be able to carry seven or eight television channels at a high resolution, but may be able to carry dozens, fifty, a hundred, two hundred, or some other number of television channels at reduced resolutions.

Satellite dish 140 may be a piece of user equipment that is used to receive transponder streams from one or more satellites, such as satellites 130. Satellite dish 140 may be provided to a subscriber for use on a subscription basis to receive television channels provided by the television service provider system 110, satellite transmitter equipment 120, and/or satellites 130. Satellite dish 140, which may include one or more low noise blocks (LNBs), may be configured to receive transponder streams from multiple satellites and/or multiple transponders of the same satellite. Satellite dish 140 may be configured to receive television channels via transponder streams on multiple frequencies. Based on the characteristics of television receiver 150 and/or satellite dish 140, it may only be possible to capture transponder streams from a limited number of transponders concurrently. For example, a tuner of television receiver 150 may only be able to tune to a single transponder stream from a transponder of a single satellite at a given time. The tuner can then be re-tuned to another transponder of the same or a different satellite. A television receiver 150 having multiple tuners may allow for multiple transponder streams to be received at the same time.

Figure 2:
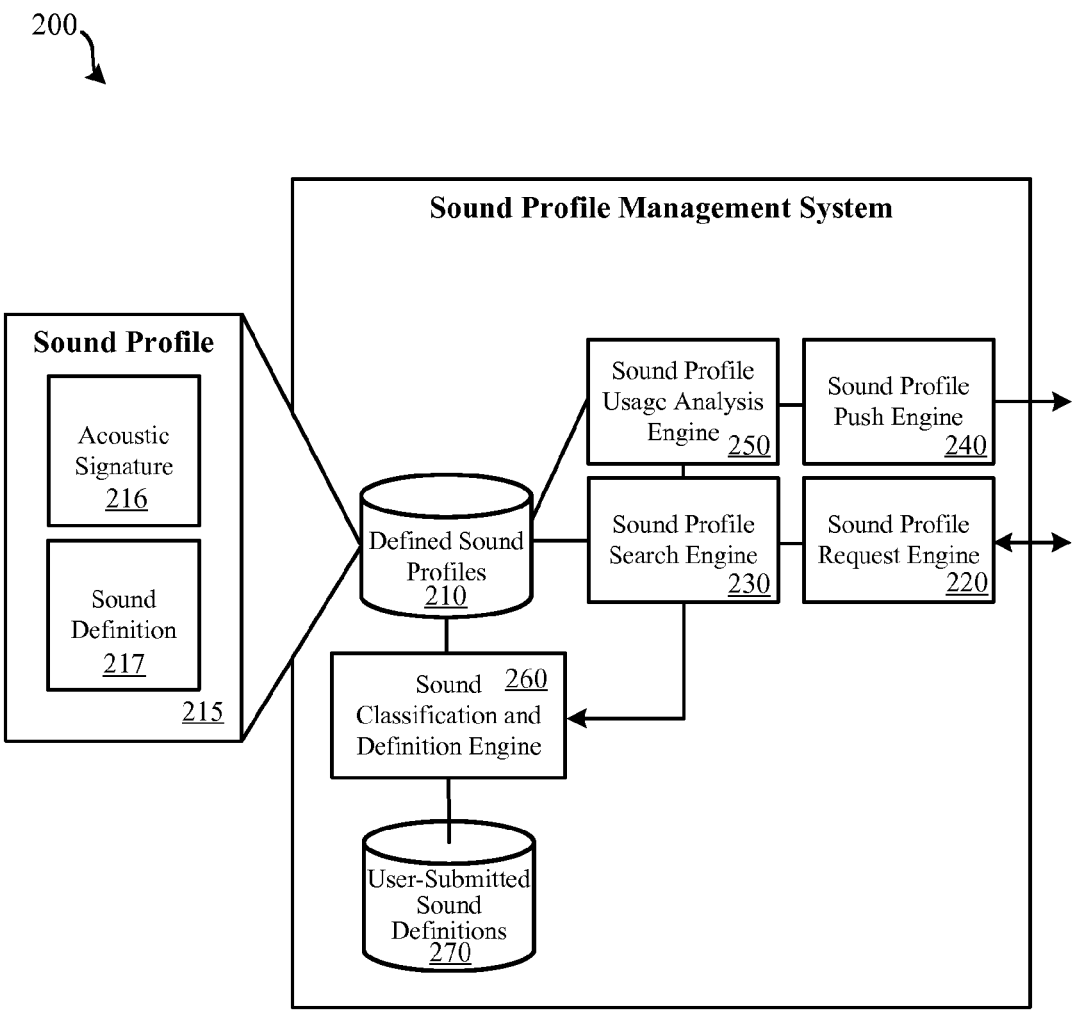
FIG. 2 illustrates an embodiment of a sound profile management system.

In communication with satellite dish 140 may be one or more television receivers. Television receivers may be configured to decode signals received from satellites 130 via satellite dish 140 for output and presentation via a display device, such as display device 160. A "television receiver" may be incorporated as part of a television or may be part of a separate device, commonly referred to as a set-top box (STB). Television receiver 150 may decode signals received via satellite dish 140 and provide an output to display device 160. FIG. 2 provides additional detail of various embodiments of a television receiver. A television receiver is defined to include set-top boxes (STBs) and also circuitry having similar functionality that may be incorporated with another device. For instance, circuitry similar to that of a television receiver may be incorporated as part of a television. As such, while FIG. 1 illustrates an embodiment of television receiver 150 as separate from display device 160, it should be understood that, in other embodiments, similar functions may be performed by a television receiver integrated with display device 160.

Display device 160 may be used to present video and/or audio decoded and output by television receiver 150. Television receiver 150 may also output a display of one or more interfaces to display device 160, such as an electronic programming guide (EPG). In many embodiments, display device 160 is a television. Display device 160 may also be a monitor, computer, or some other device configured to display video and, possibly, play audio.

Uplink signal 170-1 represents a signal between satellite transmitter equipment 120 and satellite 130-1. Uplink signal 170-2 represents a signal between satellite transmitter equipment 120 and satellite 130-2. Each of uplink signals 170 may contain streams of one or more different television channels. For example, uplink signal 170-1 may contain a first group of television channels, while uplink signal 170-2 contains a second group of television channels. Each of these television channels may be scrambled such that unauthorized persons are prevented from accessing the television channels.

Transponder stream 180-1 represents a transponder stream signal between satellite 130-1 and satellite dish 140. Transponder stream 180-2 represents a transponder stream signal between satellite 130-2 and satellite dish 140. Each of transponder streams 180 may contain one or more different television channels, which may be at least partially scrambled. For example, transponder stream 180-1 may be a first transponder stream containing a first group of television channels, while transponder stream 180-2 may be a second transponder stream containing a different group of television channels. When a television channel is received as part of a transponder stream and is decoded and output to display device 160 (rather than first storing the television channel to a storage medium as part of DVR functionality then later outputting the television channel from the storage medium), the television channel may be considered to be viewed "live."

FIG. 1 illustrates transponder stream 180-1 and transponder stream 180-2 being received by satellite dish 140 and distributed to television receiver 150. For a first group of television channels, satellite dish 140 may receive transponder stream 180-1 and for a second group of channels, transponder stream 180-2 may be received. Television receiver 150 may decode the received transponder streams. As such, depending on which television channels are desired to be presented or stored, various transponder streams from various satellites may be received, descrambled, and decoded by television receiver 150.

Network 190 may serve as another communication channel between television service provider system 110 and television receiver 150. In some instances, television receiver 150 may be disconnected from network 190 (for reasons such as because television receiver 150 is not configured to connect to network 190 or a subscriber does not desire or cannot connect to network 190). Via such a secondary communication channel, bidirectional exchange of data may occur. As such, data may be transmitted to television service provider system 110 from television receiver 150 via network 190. Data may also be transmitted from television service provider system 110 to television receiver 150 via network 190. Network 190 may be the Internet. While audio and video services may be provided to television receiver 150 via satellites 130, feedback from television receiver 150 to television service provider system 110 may be transmitted via network 190.

Sound profile management system 111 may be a system configured to distribute sound profiles that are used in identifying various sounds received by television receiver 150 via one or more microphones. Sound profile management system 111 may distribute sound profiles to television receivers via satellites 130. For instance, a defined set of sound profiles (e.g., the most common sound profiles) may be distributed to some or all television receivers via one or more transponder streams via satellites 130. By using satellites 130 to distribute sound profiles, it may be possible for sound-triggered messaging system 151 to be in at least unidirectional communication with sound profile management system 111 without connectivity with network 190. As such, sound-triggered messaging system 151 may periodically receive updates to locally-stored sound profiles via satellites 130 despite television receiver 150 having access to network 190. Additionally or alternatively, such sound profiles may be transmitted via network 190 to television receiver 150. Further, sound profile management system 111 may be configured to respond to queries from television receiver 150 (and other television receivers) via network 190. Further detail regarding some embodiments of sound profile management system 111 is provided in relation to FIG. 2.

Sound-triggered messaging system 151 may be incorporated as part of television receiver 150. Sound-triggered messaging system 151 may receive sound data from one or more microphones installed within the house where television receiver 150 is installed. Sound-triggered messaging system 151 may either locally identify a sound using previously-received sound profiles or may query sound profile management system 111 via network 190 to identify a sound. Sound-triggered messaging system 151 may output messages for presentation to display device 160, such as the message of FIG. 4. Further detail regarding some embodiments of sound-triggered messaging system 151 is provided in relation to FIG. 3. In other embodiments, the television distribution system 100 may be modified to be cable-based, IP-based, or wireless.

Figure 8:
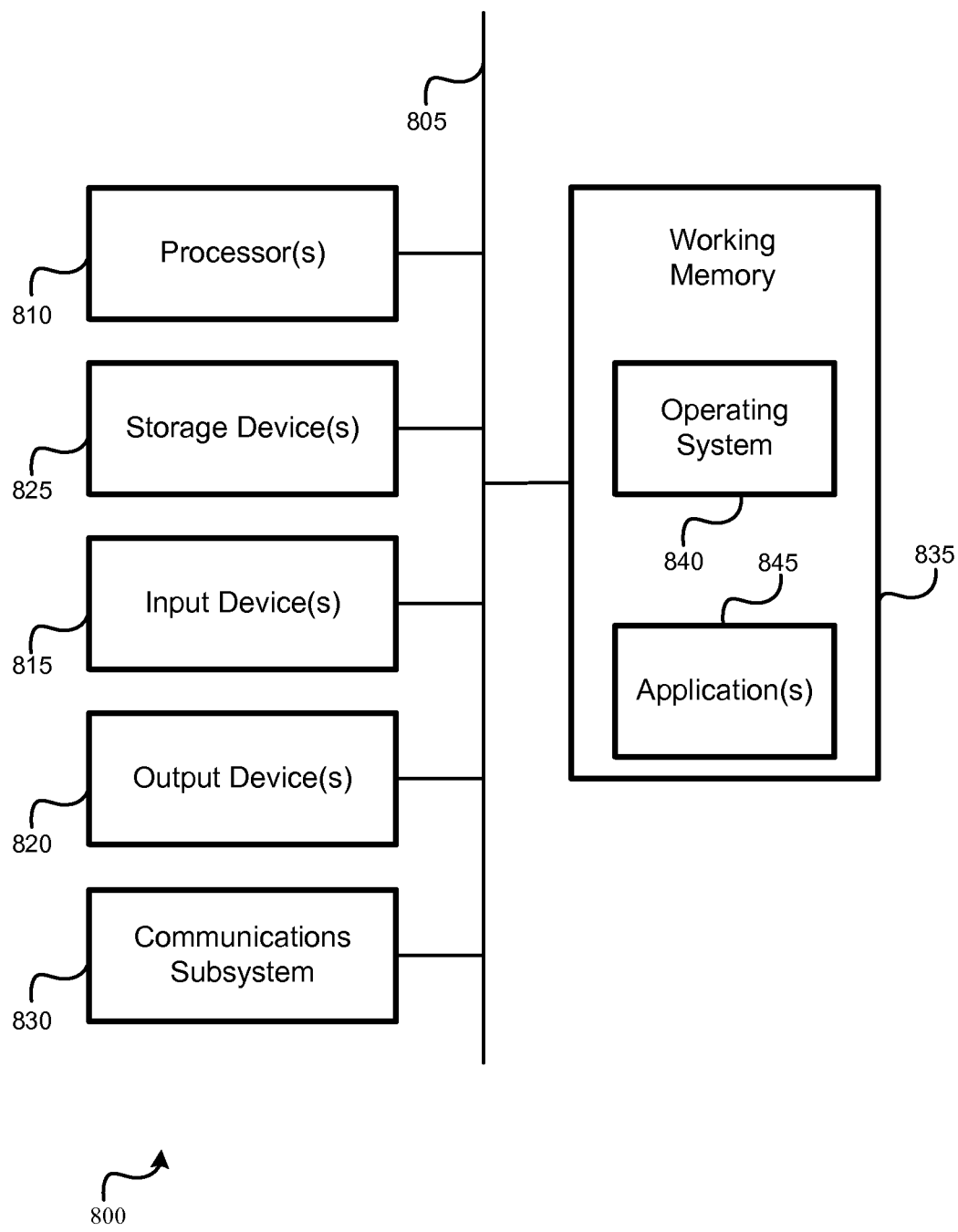
FIG. 8 illustrates an embodiment of a computer system.

FIG. 2 illustrates an embodiment of a sound profile management system 200. Sound profile management system 200 may represent sound profile management system 111 of FIG. 1. Sound profile management system 200 may be implemented using one or more server systems, which may be part of a distributed computing system, to communicate with various sound-triggered messaging systems, such as sound-triggered messaging system 151. In some embodiments, sound profile management system 200 is integrated with or in communication with a television service provider's distribution network, thus allowing distribution networks, such as a satellite-based distribution network, that is typically used for distribution of television programming to also be used for distribution of data related to sound identification, such as sound profiles. Sound profile management system 200 may include: defined sound profiles 210 (which may be stored using one or more non-transitory processor-readable mediums), sound profile request engine 220, sound profile search engine 230, sound profile push engine 240, sound profile usage analysis engine 250, sound classification and definition engine 260, and user-submitted sound definitions 270 (which may be stored using one or more non-transitory processor-readable mediums). Such components may be implemented using computerized hardware, firmware, and/or software executed using underlying hardware. For instance, computer system 800 of FIG. 8 illustrates a computer system which may serve as the hardware for sound profile management system 200. It should be understood that the functionality of sound profile management system 200 may be distributed over multiple computer systems.

Defined sound profiles 210 may store a plurality of sound profiles, such as sound profile 215. Sound profile 215, which serves as an example of a sound profile stored as part of defined sound profiles 210, includes acoustic signature 216 and sound definition 217. Acoustic signature 216 may represent various auditory characteristics of a sound. For instance, acoustic signature 216 may include a sample of a sound produced by a particular appliance or object. Acoustic signature 216 may include an indication of a frequency, duration, and/or other characteristics of a particular sound which may be detected in a household environment. Sound definition 217 may include data associated with acoustic signature 216. For example, if acoustic signature 216 is a sample of a dishwasher's complete cycle auditory signal (e.g., for a particular brand/model of dishwasher), sound definition 217 may indicate that acoustic signature 216 is associated with the dishwasher's complete signal. Stored as part of sound definition 217 may be an indication of a priority level of the sound. For instance, the priority level may indicate whether the sound is associated with an emergency or nonemergency event. When such a sound is detected, whether the sound is classified as an emergency or nonemergency sound may govern how the user is notified that the sound is been detected. Sound profiles which are part of defined sound profiles 210 may represent sound profiles that have been confirmed or at least expected to be accurate. Defined sound profiles 210 may have been created by an operator of sound profile management system 200 and/or may be based on sound profiles created based on user submissions. Sound profiles created based on user submissions may first be vetted, as will be discussed, via a comparison process.

Sound profile request engine 220 may serve to receive recordings of sounds from sound-triggered messaging systems via a network, such as network 190. Data received by sound profile request engine 220 may be a recording of the sound or information derived from a recording of the sound. By sound profile request engine 220 receiving a recording of a sound or information derived from a recording of the sound, sound profile management system 200 may be triggered to attempt to identify the sound by using defined sound profiles 210. Sound profile request engine 220 may pass the received data to sound profile search engine 230. Sound profile search engine 230 may search defined sound profiles 210 for a sound profile that matches the received data. Sound profile search engine 230 may determine that a matching sound profile has been found if a match within a threshold level of confidence is identified. The threshold level of confidence may be defined by an operator of sound profile management system 200 or by a user of the sound-triggered messaging system from which the request was received. The matching sound profile may be transmitted to the sound-triggered messaging system from which the request was received by sound profile request engine 220. If a match is not identified by sound profile search engine 230, the recorded sound or information derived from the recorded sound may be passed to sound classification and definition engine 260.

Sound classification and definition engine 260 may use sounds received from various sound-triggered messaging systems to create crowd-sourced sound profiles. When an unrecognized recording of a sound or information derived from a recording of the sound is passed to sound classification and definition engine 260, sound profile request engine 220 may be triggered to query the sound-triggered messaging system from which the request was received as to a source of the sound. Such a request may allow a user interacting with the sound-triggered messaging system to playback a recording of the sound and provide information that identifies the source of the sound. For instance, a user could indicate that the sound was made by a motor from a (particular make and model of) sump pump. The definition provided by the user and the recording of the sound or information derived from the recording of the sound may be stored by sound classification and definition engine 260 to user-submitted sound definitions 270. Periodically or based on input by an operator of sound profile management system 200, sound classification and definition engine 260 may analyze user-submitted sound definitions 270 to identify multiple sounds that likely match. When a threshold number of user-submitted sounds are determined to match each other, the definitions provided by the various users from the various sound-triggered messaging systems may also be compared. If the definitions are similar enough, it may be determined by sound classification and definition engine 260 that an accurate sound profile can be created based on the user submitted definitions and the received recording of the sound or information derived from the recording of the sound. With or without user input, sound classification and definition engine 260 may create a sound profile, having an acoustic signature and a sound definition, from the one or more user submitted sound definitions and add the new sound profile to defined sound profiles 210. This new sound profile may then be available for use by sound profile search engine 230 and for transmission to one or more sound-triggered messaging systems.

Sound profile push engine 240 may be configured to push various sound profiles from defined sound profiles 210 to multiple sound-triggered messaging systems. For instance, sound profile push engine 240 may be configured to periodically push a predefined number of the most commonly-used sound profiles to various sound-triggered messaging systems. Sound profile push engine may use a television distribution network, such as the satellite-based system of FIG. 1, to distribute sound profiles that are to be pushed to multiple sound-triggered messaging systems. For instance, such a distribution method may be useful for when one or more sound profiles are to be pushed to hundreds or thousands of sound-triggered messaging systems. It may also be possible for sound profile push engine 240 to distribute sound profiles via a bidirectional network, such as the Internet.

Sound profile usage analysis engine 250 may be used to determine which sound profiles of defined sound profiles 210 should be pushed by sound profile push engine 240 to multiple sound-triggered messaging systems. Sound profile usage analysis engine 250 may track, for instance, sound profiles that are provided in response to requests from sound-triggered messaging systems. Those sound profiles which are requested most often may be pushed such that the profiles are received and stored by sound-triggered messaging systems and are thus made locally available to some or all sound-triggered messaging systems. For example, sound profile usage analysis engine 250 may track which sound profiles of defined sound profiles 210 are the two thousand most commonly-used sound profiles. These sound profiles may be pushed out to some or all sound-triggered messaging systems via sound profile push engine 240 such that they are made locally available. When such locally available sound profiles are used for identifying a sound in a household by a sound-trigged messaging system, sound profile management system 200 may still receive information indicating that such profiles have been used for sound identification, thus allowing sound profile usage analysis engine 250 to determine how frequently locally stored sound profiles are used by sound-triggered messaging systems to identify sounds in a household. Therefore, sound profile usage analysis engine 250 may take into account not only requests for sound profiles received via sound profile request engine 220 but also the usage of sound profiles that are stored locally by sound-triggered messaging systems.

Figure 3:
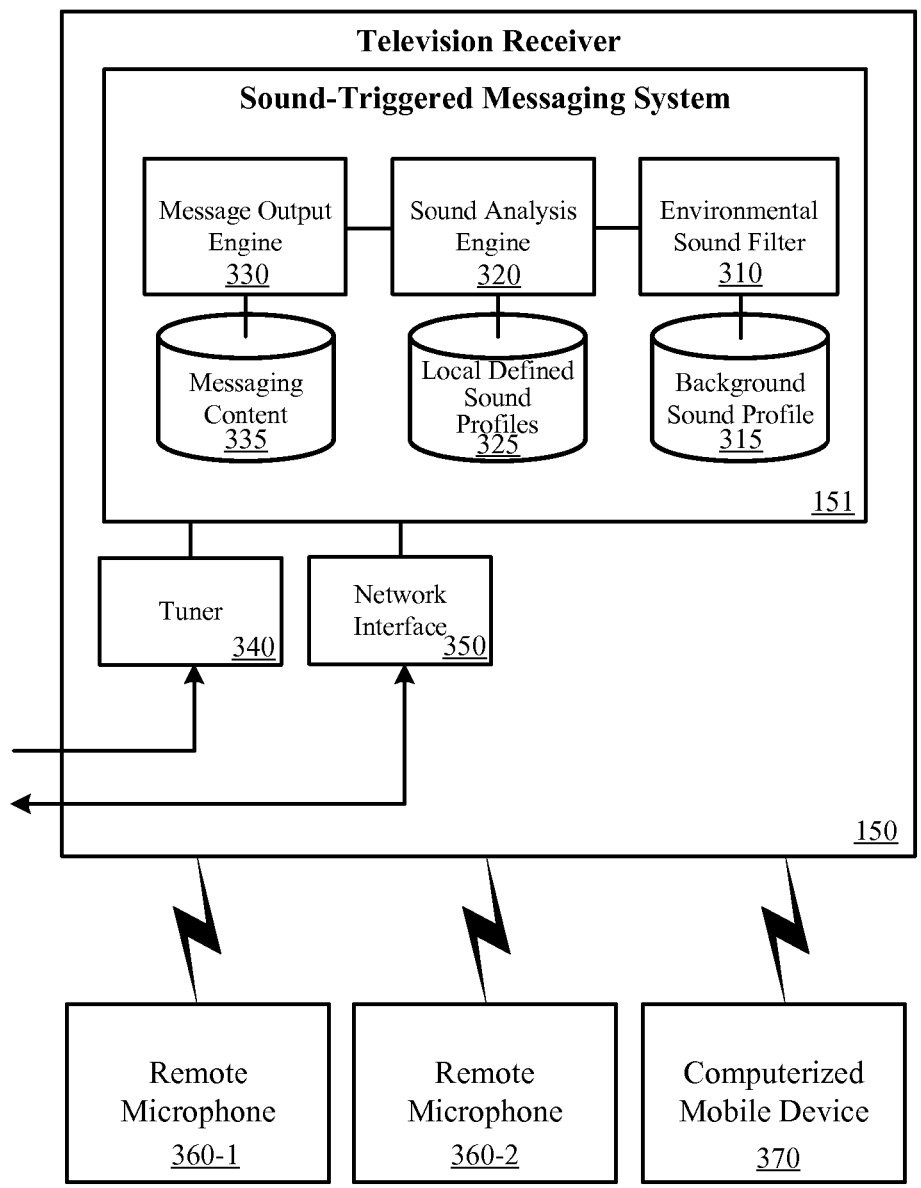
FIG. 3 illustrates an embodiment of a television receiver having a sound-triggered messaging system.

FIG. 3 illustrates an embodiment of household sound-monitoring system 300 that includes a television receiver 150 having an integrated sound-triggered messaging system 151. While in some embodiments sound-triggered messaging system 151 may be implemented using a television receiver, such as television receiver 150, in other embodiments sound-triggered messaging system 151 may be implemented using a different or stand-alone electronic device. For instance, sound-triggered messaging system 151 may be implemented using a dedicated computerized device.

Household sound-monitoring system 300 may include television receiver 150 having an integrated sound-triggered messaging system 151, one or more remote microphones, which are represented by remote microphones 360, and one or more computerized mobile devices represented by computerized mobile device 370.

Television receiver 150 may include components typically associated with a television receiver, such as one or more tuners, represented by tuners 340, and a network interface 350. Tuner 340 may be configured to receive a transponder stream transmitted to television receiver 150 via a television distribution system, such as the satellite-based version presented in FIG. 1. Accordingly, tuner 340 may be used by television receiver 150 to receive various forms of television programming, including broadcast television programming. Tuner 340 may also be used to receive information for sound-triggered messaging system 151, such as sound profiles. Tuner 340 may be used to receive information pushed via the satellite distribution system by sound profile push engine 240. Network interface 350 may be used for bidirectional communication with network 190. Therefore, network interface 350 may be used by sound-triggered messaging system 151 to communicate with sound profile request engine 220 of sound profile management system 200. It should be understood that television receiver 150 may include various other components, at least some of which may be computerized and are detailed in relation to computer system 800 of FIG. 8.

Sound-triggered messaging system 151, which is integrated with television receiver 150, may be in communication with one or more microphones, such as via a wired or wireless communication link. In some embodiments, television receiver 150 may have one or more integrated microphones. In some embodiments, dedicated remote microphones may be used. For instance remote microphone 360-1 may be installed in a room away from sound-triggered messaging system 151, such as a basement, while remote microphone 360-2 is installed in another room, such as a kitchen of the same household. Other existing microphones may also be used by sound-triggered messaging system 151 to collect sounds from the household environment. For instance, various computerized mobile devices 370 may have one or more microphones present on them. For instance, a cellular phone, laptop computer, tablet computer, television, or Blu-ray player, just to name a few examples, may have integrated microphones which may be used to collect auditory information such as recordings and provide such auditory information to sound-triggered messaging system 151. In some embodiments, remote microphones 360 and computerized mobile device 370 may be configured to ignore sounds that are below a threshold volume level.

While sounds that are typically audible by humans may be monitored, it may also be possible for the system to monitor for sounds that are above and/or below the frequency range of sound heard by humans. Such sub- and ultra-sonic sound may be used in identifying status of devices or objects within a household. One difference may be that it would not be possible to playback such sounds to a user.

Sound-triggered messaging system 151 may include various hardware, firmware, or software being executed by hardware components. Such components may include environmental sound filter 310, background sound profile 315, sound analysis engine 320, local defined sound profiles 325, message output engine 330, and messaging content 335. Background sound profile 315, local defined sound profiles 325, and messaging content 335 may be stored using one or more non-transitory processor readable mediums, such as RAM or a hard drive.

When recording of the sound is received by sound-triggered messaging system 151, the recorded sound may be filtered using environmental sound filter 310. Environmental sound filter 310 may serve to remove background noise from sounds recorded by microphones, such as remote microphones 360 and computerized mobile device 370. Environmental sound filter 310 may employ a background sound profile 315 that has been generated over time by listening to the ambient environment within the household using various microphones. For example, a separate background sound profile may be created and used for filtering sound received from each microphone. As such, sounds which are identified as environmental background noise by environmental sound filter 310 may be ignored and not analyzed using sound analysis engine 320.

For sounds which are not filtered out by environmental sound filter 310, sound analysis engine 320 may analyze the recorded sound. Sound analysis engine 320 may compare the recorded sound, which has been filtered by environmental sound filter 310, to one or more locally stored sound profiles present in local defined sound profiles 325. Local defined sound profiles 325 may have been at some time earlier received from sound profile management system 200. For instance, a sound profile stored as part of local defined sound profiles 325 may have been received from sound profile push engine 240 or may have been received in response to previous queries submitted to sound profile request engine 220. If sound analysis engine 320 identifies a match, within a threshold confidence level, to a local defined sound profile, no communication with sound profile management system 200 to retrieve an additional sound profile may be necessary. The confidence level used by sound analysis engine 320 may be defined by the service provider or may be customized by the user. For instance, a user may decrease the required confidence level to make it more likely that sound-triggered messaging system 151 will find a match. Such an increase in the confidence level performed by the user may, however, cause more errors to be performed in matching sounds.

If sound analysis engine 320 is unable to find a match, within a defined threshold level, in local defined sound profiles 325, the recording of the sound or information derived from the recording of the sound may be passed to sound profile request engine 220 via network interface 350. The sound may then be analyzed by sound profile management system 200 as detailed in relation to FIG. 2. In response, sound analysis engine 320 may receive a sound profile determined to be a match or instead may receive an indication that no match was identified.

If a match is made to either a sound profile of local defined sound profiles 325 or a sound profile stored in defined sound profiles 210 of sound profile management system 200, a message may be output for presentation to a user via message output engine 330. The message generated may indicate the source, time, and/or location of the identified sound. Message output engine 330 may output the message via one or more devices capable of displaying information to a user, such as the television connected with television receiver 150. If television receiver 150 is actively outputting television programming, the message output by message output engine 330 may be overlaid over at least a portion of the television programming currently being output by television receiver 150 to the connected television. If television receiver 150 is not currently outputting television programming to a television, the message to be output by message output engine 330 may be redirected to another device, such as a mobile device (e.g., cellular phone) of the user, or may be saved such as until such a log is accessed or the television receiver begins actively outputting video to the connected television.

Message output engine 330 may use information from the identified sound profile, such as the sound definition, to create a message for output for presentation to a user. Additionally, message output engine 330 may use messaging content 335 to augment the information inserted in the message. For instance, messaging content 335 may include indications of locations as to where various sounds would be generated in a user's household. For instance if the sound profile is for dishwasher, messaging content 335 may include an indication of where the dishwasher is located within the user's household. Messaging content 335 may also include customized messages created by a user to be presented when a sound is identified. For instance, if a dishwasher sound is detected that signals the dishwasher door being open, the message may be customized to read "You didn't push the dishwasher door all the way shut!"

If sound analysis engine 320 is unable to find a matching sound profile either in local defined sound profiles 325 or by querying sound profile management system 200, sound analysis engine 320 may use message output engine 330 to present a user with an indication that the sound was identified and provide the user an opportunity to identify the sound. When such an interface is output for presentation, the user may have the option of playing back a recording of the sound that was recorded by sound-triggered messaging system 151 such that the user can hear the sound in an attempt to identify it. If the user is able to identify the sound, the user may be permitted to respond to the message and provide information identifying what the sound is. Sound analysis engine 320 may pass such information to sound classification and definition engine 260 of sound profile management system 200.

Figure 4:
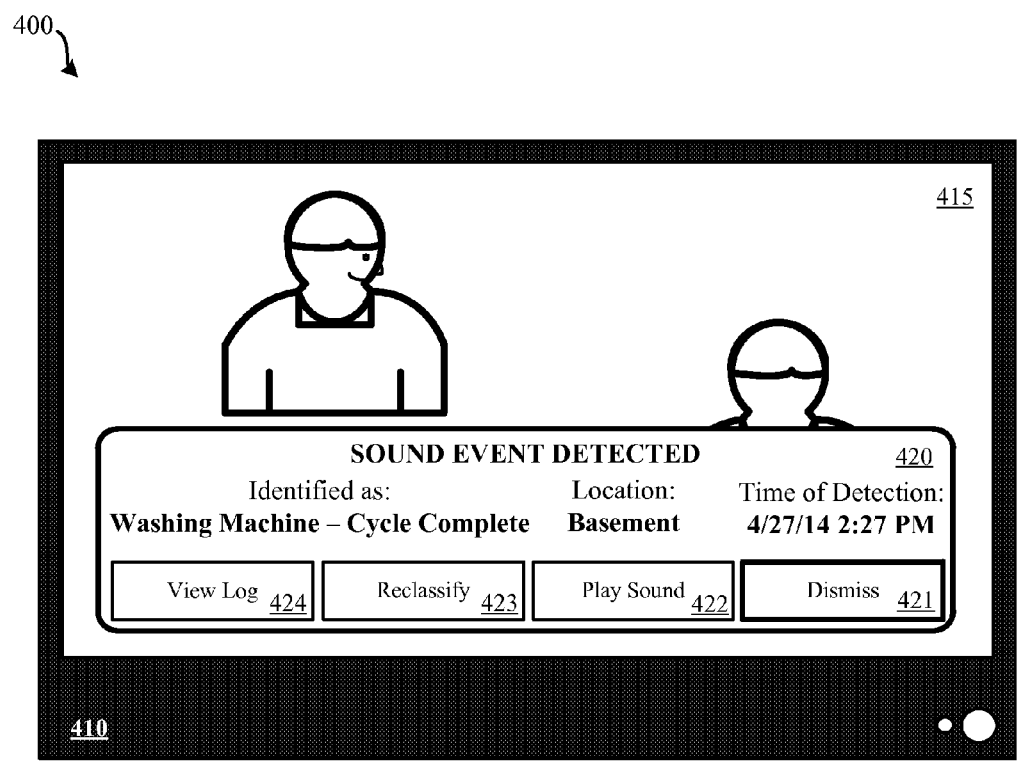
FIG. 4 illustrates an embodiment of a user interface output by a sound-triggered messaging system via a television.

FIG. 4 illustrates an embodiment 400 of a user interface output by a sound-triggered messaging system via a television. In embodiment 400, television 410 is outputting television programming 415. Overlaid on television programming 415 is an indication of a sound event being detected. Overlay 420 provides an indication as to what the sound was identified as, the location, and the time and date of detection. In the illustrated example, the sound was identified as an auditory complete cycle signal being output by a washing machine within the household. The location may have been determined based on a user-supplied indication of where the washing machine is located within the user's household or may be determined based on where the microphone is located at which the sound from the washing machine was recorded. When the sound is received by sound-triggered messaging system 151, a timestamp may be stored in association with a recording of the sound that is indicative of the date and time at which the sound event was detected. While overlay 420 may be used to provide the user with an indication of the sound event being detected, it should be understood that rather than using overlay 420, the entire display of television 410 may be used for presenting information about sound events. In some embodiments, sound events are only presented when a user has indicated via a menu that sound events are desired to be reviewed. In other embodiments, as sound events are detected, sound events may be presented via the television when the television receiver is actively outputting television programming for presentation to the television receiver.

In conjunction with the sound event, a user may have one or more options. The user may have the ability to dismiss the indication of the sound event via dismiss element 421 such that overlay 420 is no longer presented. The user may wish to hear the sound that is associated with the sound event, such as if the user believes the incorrect sound has been identified. Play sound element 422 may permit a user to listen to the recording of the sound stored by sound-triggered messaging system 151. The user may be able to reclassify the sound to indicate what the sound should have been identified as. To perform such a reclassification, the user may select reclassify element 423. A user may also have the ability to view a log of previous sound events that have been detected by selecting view log element 424.

It should be understood that the presentation of overlay 420 and the various elements presented that allow a user to perform various actions in response to the sound event are merely exemplary. As such, the presentation of the information related to the sound event and/or the options that the user is permitted to select in response to the sound event may vary by embodiment.

The interface output of FIG. 4 is presented via a television, however it should be understood that similar information may be output via other display devices, such as a user's mobile phone. The severity of the sound, such as whether it is directed to an emergency event (alarm, broken glass) or a non-emergency household event (toast has been ejected by the toaster), may determine how the indication of the sound event is pushed to the device. For instance, a push notification to a user's mobile device may be used if the sound is emergency-related. Additionally, a television may be turned on to display the indication of the sound event if the sound is determined to be emergency related. Notification of non-emergency sounds may be sent via email or may be accessed via an application installed on the user's mobile device.

Figure 5:
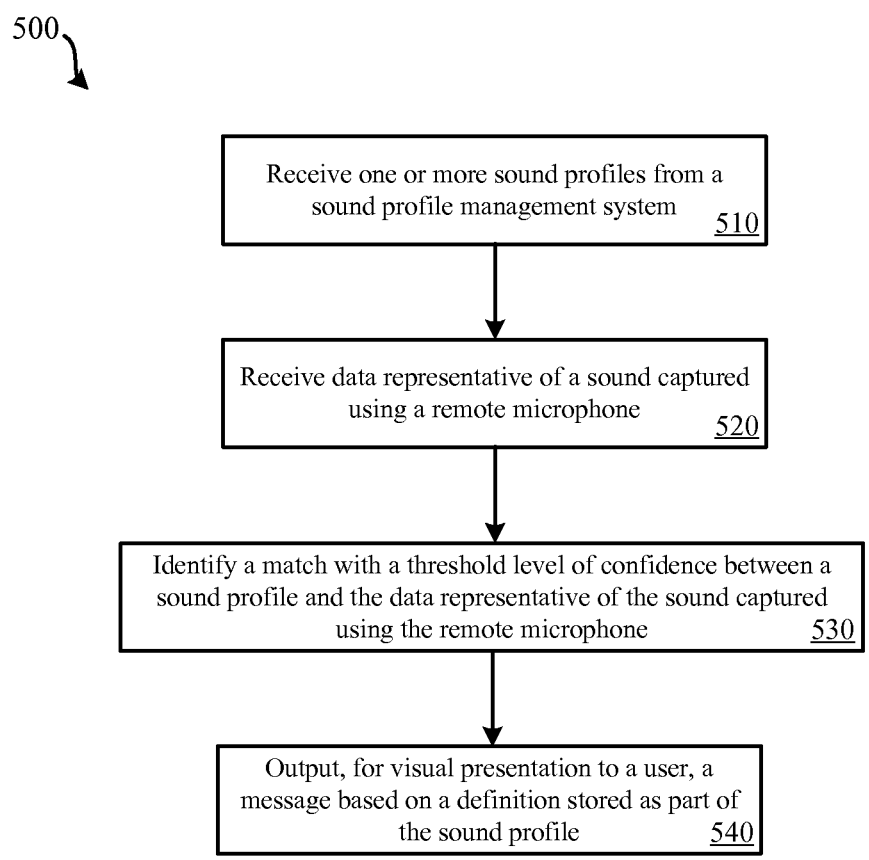
FIG. 5 illustrates an embodiment of a method for alerting a user to a household environmental sound.

Various methods may be performed using the systems and interfaces detailed in relation to FIGS. 1 through 4. FIG. 5 illustrates an embodiment of a method 500 for alerting a user to a household environmental sound. The steps of method 500 may be performed using a sound-triggered messaging system, such as sound-triggered messaging system 151 of FIGS. 1 and 3. Such a sound-triggered message system may be integrated with a television receiver or may be a standalone device.

At block 510, one or more sound profiles may be received from a sound profile management system. Such sound profiles may have been transmitted to some or all sound-triggered message systems in communication with a television service distribution system, such as via television distribution system 100 of FIG. 1. These profiles may be stored by the sound-triggered message system for use in identifying sounds. In some embodiments, the profiles provided to a sound-triggered message system may be based on a questionnaire completed by a user prior to block 510. The questionnaire may request information on makes and models of appliances and other devices present in the user's household and the locations within the household as to where microphones are located. Sound profiles transmitted by the sound profile management system to the sound-triggered message system may correspond to sounds typically generated by the appliances and other devices identified by the user and the locations at which microphones are present.

At block 520, the sound-triggered message system receives data representative of sound captured using a remote microphone (or a microphone local to the sound-triggered message system). This sound may have been pre-filtered by the device having the microphone to be at least a threshold volume. Therefore, sounds below a threshold volume may not be provided to the sound-triggered message system.

At block 530, a match may be identified between one of the sound profiles received at block 510 and the data representative of the sound received at block 520. This match may be determined within a threshold level of confidence. This level of confidence may be defined by a user or by the service provider.

At block 540, a message may be created and output for visual presentation based upon the sound profile identified as the match at block 530. This sound profile contains a definition which can be used to provide a user within information about the detected sound. For instance, the definition may be: "GE Profile® Dishwasher—Washing Cycle Complete." The message created at block 540 may include a time, date, and/or location at which the sound occurred. How the message is output at block 540 may vary based on the priority level of the message (e.g., emergency or non-emergency) and whether a television receiver is actively outputting content. If so, the message may be presented as a visual overlay on a television connected with the television receiver (of which sound-triggered message system may be integrated). Additionally or if the television receiver is not outputting content, the message may be transmitted to one or more mobile devices, such as a tablet computer or cellular phone of the user. How the message is transmitted to such a device (e.g., push notification, text message, phone call, email, alert via an application) may be governed by user preferences defined by the user and/or the priority level of the message.

Figure 6:
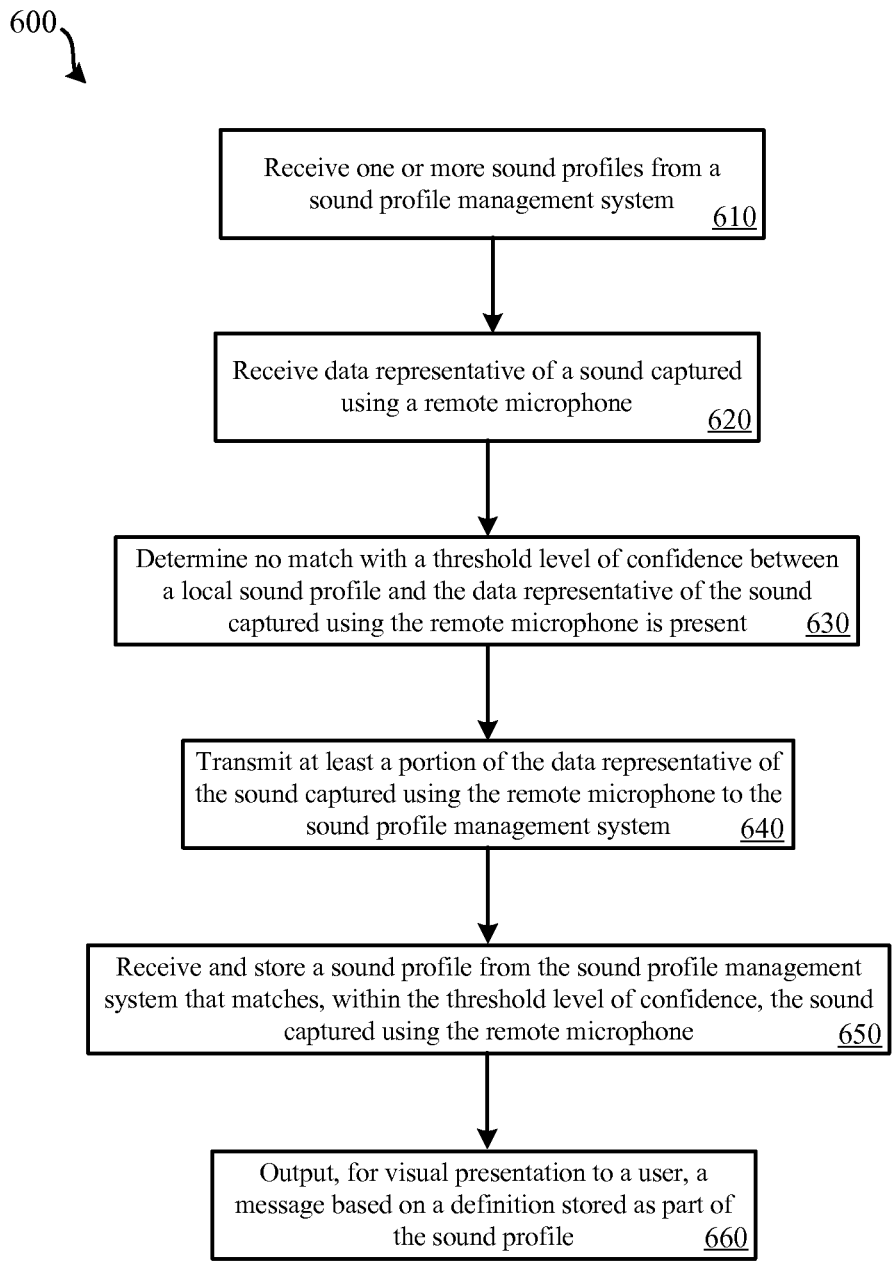
FIG. 6 illustrates another embodiment of a method for alerting a user to a household environmental sound.

FIG. 6 illustrates an embodiment of a method 600 for alerting a user to a household environmental sound. The steps of method 600 may be performed using a sound-triggered messaging system, such as sound-triggered messaging system 151 of FIGS. 1 and 3. Such a sound-triggered message system may be integrated with a television receiver or may be a standalone device.

At block 610, one or more sound profiles may be received from a sound profile management system. Such sound profiles may have been transmitted to some or all sound-triggered message systems in communication with a television service distribution system, such as via television distribution system 100 of FIG. 1. These profiles may be stored by the sound-triggered message system for use in identifying sounds as detailed in relation to block 510. In some embodiments, no local sound profiles are stored by a sound-triggered messaging system—rather blocks 610 and 630 are skipped, with the sound profile management system being used for the matching of all sounds.

At block 620, similar to block 520, the sound-triggered message system may receive data representative of sound captured using a microphone (such as a microphone local to the sound-triggered message system or a remote microphone). This sound may have been pre-filtered by the device having the microphone to be at least a threshold volume. Therefore, sounds below a threshold volume may not be provided to the sound-triggered message system. This sound may be filtered by the sound-triggered messaging system to remove background noise as detailed in relation to environmental sound filter 310 of FIG. 3.

At block 630, via a comparison of the data of block 620 with the received sound profiles of block 610, it may be determined that no match between a sound profile and the data within a threshold level of confidence is present based on a comparison performed at the sound-triggered message system. At block 640, at least a portion of the data representative of the sound may be transmitted to the sound profile management system via a network, such as the Internet, in the form of a query. This sound may be transmitted to the sound profile management system such that the sound profile management system can attempt to identify the sound. In some embodiments, a user may have to give permission for the sound to be transmitted, such as for privacy reasons. In response to the query, the sound profile management system may expect to receive either an indication that the sound could not be matched to a sound profile or a sound profile that is determined to match.

At block 650, a sound profile that was determined by the sound profile management system to match, within a threshold level of confidence, the recorded sound may be received by the sound profile management system. The threshold level of confidence used by the sound profile management system may differ from the threshold level of confidence used by the sound profile management system for identifying local matches. In some embodiments, following receiving the sound profile at block 650, the sound profile management system may perform its own comparison to confirm that the recorded sound matches the received sound profile within a threshold confidence level.

At block 660, a message may be created and output for visual presentation based upon the sound profile identified as the match at block 650. This sound profile contains a definition which can be used to provide a user within information about the detected sound. The message created and output at block 660 may include a time, date, and/or location at which the sound occurred. How the message is output at block 660 may vary based on the priority level of the message (e.g., emergency or non-emergency) and whether a television receiver is actively outputting content. If so, the message may be presented as a visual overlay on a television connected with the television receiver (of which sound-triggered message system may be integrated). Additionally or if the television receiver is not outputting content, the message may be transmitted to one or more mobile devices, such as a tablet computer or cellular phone of the user. How the message is transmitted to such a device (e.g., push notification, text message, phone call, email, alert via an application) may be governed by user preferences defined by the user and/or the priority level of the message. The message output for presentation to the user may indicate that the sound profile management system was used to identify a matching sound profile.

Figure 7:
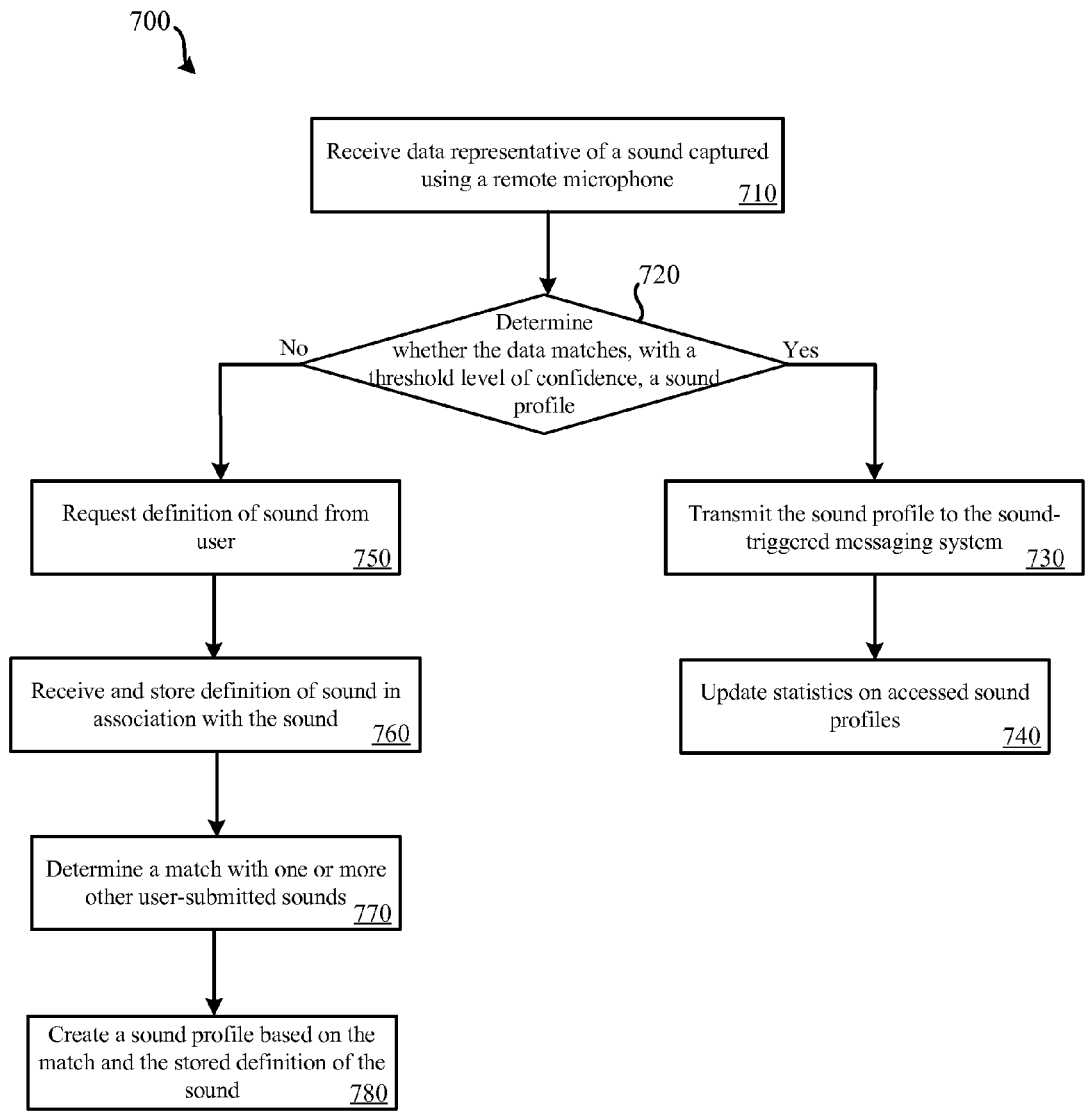
FIG. 7 illustrates an embodiment of a method for creating a sound profile for an unidentified sound using crowdsourced data.

FIG. 7 illustrates an embodiment of a method 700 for creating a sound profile for an unidentified sound using crowd-sourced data. The steps of method 600 may be performed using a sound profile management system, such as sound profile management systems 111 and 200 of FIGS. 1 and 2, respectively. Such a sound profile management system may be integrated with a television service provider's television programming distribution system or may be maintained separately.

At block 710, data may be received from a sound-triggered messaging system indicative of a sound recorded using a microphone in communication with the sound-triggered messaging system. The data may be received because the sound-triggered messaging system was unable to identify the sound using locally-stored profiles. In other embodiments, the sound-triggered messaging system may not maintain local sound profiles and may use sound profile management system for identification of all sounds.

At block 720, the received data may be compared to stored sound profiles, such as the sound profiles stored in defined sound profiles 210 of sound profile management system 200 of FIG. 2. Within a threshold level of confidence, at block 720 it may be determined whether the received sound matches or does not match a sound profile stored in a database of defined sound profiles.

If block 720 is evaluated as a match being identified, at block 730 the matching sound profile may be transmitted to the sound-triggered messaging system. At block 740, statistics on sound profiles matched to sounds may be updated. Such statistics may be maintained by sound profile usage analysis engine 250 of FIG. 2.

If block 720 is evaluated as a match not being identified, at block 750 a query may be transmitted to the sound-triggered messaging system that requests a definition of the sound from a user. The sound-triggered messaging system may be configured to playback a recording of the sound to a user and request a definition, such as in the form of entered text, for the sound. For example, a user could enter a make, model, and type of appliance, along with a definition of the sound. At block 760, the recording of the sound or information derived from the recording of the sound may be stored in association with the definition received from the user. In some embodiments, only the recording of the sound or the information derived from the recording of the sound is stored (without a definition). In some embodiments, a sound profile may be created from this singular instance of the sound. In other embodiments, the sound may be required to be matched with at least a threshold number of other sounds (e.g., three, by separate sound-triggered messaging systems) submitted that do not match sound profiles. By requiring a match, the definitions provided by the users can be compared for similarity to determine if the definitions are likely accurate (or at least consistent).

At block 770, a match may be identified between the user-submitted sound stored at block 760 and one or more other user-submitted sounds. Such other user-submitted sounds may have been submitted by other users via other sound-triggered messaging systems. Determining that a match is present at block 770 may include a comparison of the recordings and/or a comparison of the user-submitted definitions. For instance, if two users submit sounds that are described as "LG Washing Machine—Complete Cycle" it may be more likely the recorded sounds will match. As such, a weight may be assigned to the comparison of the definition and the comparison of the recorded sounds.

At block 780, a sound profile may be created based on the match determined at block 770. The sound profile may be created with an acoustic profile using one or both of the user-submitted sounds identified as matching at block 770. The sound profile may be created with a definition using one or both of the user-submitted definitions for the matching sounds. An agent of the entity operating the sound profile management system may modify the definitions submitted by the users to create the definition for the sound profile. The sound profile created at block 780 may be added to a database of defined sound profiles, such as defined sound profiles 210, that are used for identifying sounds detected by sound-triggered message systems.

FIG. 8 illustrates an embodiment of a computer system 800. One or more instances of computer system 800 may be used in embodiments of sound profile management systems, television receivers, computerized mobile device, and sound-triggered messaging systems. FIG. 8 provides a schematic illustration of one embodiment of a computer system 800 that can perform various steps of the methods provided by various embodiments. It should be noted that FIG. 8 is meant only to provide a generalized illustration of various components, any or all of which may be utilized as appropriate. FIG. 8, therefore, broadly illustrates how individual system elements may be implemented in a relatively separated or relatively more integrated manner.

The computer system 800 is shown comprising hardware elements that can be electrically coupled via a bus 805 (or may otherwise be in communication, as appropriate). The hardware elements may include one or more processors 810, including without limitation one or more general-purpose processors and/or one or more special-purpose processors (such as digital signal processing chips, graphics acceleration processors, video decoders, and/or the like); one or more input devices 815, which can include without limitation a mouse, a keyboard, remote control, and/or the like; and one or more output devices 820, which can include without limitation a display device, a printer, and/or the like.

The computer system 800 may further include (and/or be in communication with) one or more non-transitory storage devices 825, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable and/or the like. Such storage devices may be configured to implement any appropriate data stores, including without limitation, various file systems, database structures, and/or the like.

The computer system 800 might also include a communications subsystem 830, which can include without limitation a modem, a network card (wireless or wired), an infrared communication device, a wireless communication device, and/or a chipset (such as a Bluetooth™ device, an 802.11 device, a WiFi device, a WiMax device, cellular communication device, etc.), and/or the like. The communications subsystem 830 may permit data to be exchanged with a network (such as the network described below, to name one example), other computer systems, and/or any other devices described herein. In many embodiments, the computer system 800 will further comprise a working memory 835, which can include a RAM or ROM device, as described above.

The computer system 800 also can comprise software elements, shown as being currently located within the working memory 835, including an operating system 840, device drivers, executable libraries, and/or other code, such as one or more application programs 845, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the non-transitory storage device(s) 825 described above. In some cases, the storage medium might be incorporated within a computer system, such as computer system 800. In other embodiments, the storage medium might be separate from a computer system (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computer system 800 and/or might take the form of source and/or installable code, which, upon compilation and/or installation on the computer system 800 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 800) to perform methods in accordance with various embodiments of the invention. According to a set of embodiments, some or all of the procedures of such methods are performed by the computer system 800 in response to processor 810 executing one or more sequences of one or more instructions (which might be incorporated into the operating system 840 and/or other code, such as an application program 845) contained in the working memory 835. Such instructions may be read into the working memory 835 from another computer-readable medium, such as one or more of the non-transitory storage device(s) 825. Merely by way of example, execution of the sequences of instructions contained in the working memory 835 might cause the processor(s) 810 to perform one or more procedures of the methods described herein.

The terms "machine-readable medium," "computer-readable storage medium" and "computer-readable medium," as used herein, refer to any medium that participates in providing data that causes a machine to operate in a specific fashion. These mediums may be non-transitory. In an embodiment implemented using the computer system 800, various computer-readable media might be involved in providing instructions/code to processor(s) 810 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 825. Volatile media include, without limitation, dynamic memory, such as the working memory 835.

Common forms of physical and/or tangible computer-readable media include, for example, a floppy disk, a flexible disk, hard disk, magnetic tape, or any other magnetic medium, a CD-ROM, any other optical medium, any other physical medium with patterns of marks, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 810 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 800.

The communications subsystem 830 (and/or components thereof) generally will receive signals, and the bus 805 then might carry the signals (and/or the data, instructions, etc. carried by the signals) to the working memory 835, from which the processor(s) 810 retrieves and executes the instructions. The instructions received by the working memory 835 may optionally be stored on a non-transitory storage device 825 either before or after execution by the processor(s) 810.

It should further be understood that the components of computer system 800 can be distributed across a network. For example, some processing may be performed in one location using a first processor while other processing may be performed by another processor remote from the first processor. Other components of computer system 800 may be similarly distributed. As such, computer system 800 may be interpreted as a distributed computing system that performs processing in multiple locations. In some instances, computer system 800 may be interpreted as a single computing device, such as a distinct laptop, desktop computer, or the like, depending on the context.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A method for alerting a user to household environmental sounds, the method comprising:
    outputting, by a television receiver, a questionnaire that requests a make of an appliance and a location of each of a plurality of microphones within a household;
    receiving, by the television receiver, in response to the questionnaire, an indication of the make of the appliance and an indication of the location of each of the plurality of microphones within the household;
    receiving, by the television receiver, a sound profile, from a remote computer server system, that corresponds to the make of the appliance received in response to the questionnaire, wherein the sound profile comprises: a definition associated with a sound and an acoustic signature;
    receiving, by the television receiver, from a microphone of the plurality of microphones, data representative of a sound captured by the microphone;
    identifying a match, having at least a threshold level of confidence, between the data representative of the sound captured by the microphone and the sound profile; and
    outputting, by the television receiver, to a television, for visual presentation, a message based on the definition from the sound profile identified as the match, wherein the message indicates the location of the microphone which captured the sound or the location of the appliance.

2. The method for alerting the user to household environmental sounds of claim 1, further comprising:
    transmitting, by the television receiver, to the remote computer server system, at least a portion of the data representative of the sound captured by the microphone, wherein identifying the match is performed by the remote computer server system.

3. The method for alerting the user to household environmental sounds of claim 1, further comprising:
    determining, by the television receiver, that data representative of a second sound captured by a microphone of the plurality of microphones does not match, within the threshold level of confidence, any sound profile of a plurality of local sound profiles stored by the television receiver; and
    in response to determining that the data representative of the second sound captured by microphone does not match any sound profile of the plurality of local sound profiles, transmitting, by the television receiver to the remote computer server system, at least a portion of the data representative of the second sound captured by the microphone.

4. The method for alerting the user to household environmental sounds of claim 1, further comprising:
    creating a timestamp indicative of a time at which the sound was captured by the microphone; and
    outputting, by the television receiver, for presentation to the user, the timestamp concurrently with the message.

5. The method for alerting the user to household environmental sounds of claim 1, the method further comprising:

creating, by the television receiver, over time, a background model for an environment of the household, the background model being representative of background noise;

comparing, by the television receiver, the data representative of the sound captured by the microphone with the background model; and subtracting, by the television receiver, the background model from the data representative of the sound captured by the microphone prior to identifying the match.

6. The method for alerting the user to household environmental sounds of claim 1, the method further comprising:

receiving, by the television receiver, from a microphone of the plurality of microphones, data representative of a second sound captured by the microphone;

determining that the remote computer server system does not store any sound profile that matches the second sound;

in response to determining that the remote computer server system does not store any sound profile that matches the second sound, outputting, by the television receiver, for presentation to the user, an interface to allow the user to identify the second sound;

while presenting the interface, outputting, by the television receiver, a recording of the second sound;

receiving, by the television receiver, a second definition of the second sound from the user; and transmitting, by the television receiver, the second definition of the second sound and at least a portion of the data representative of the second sound captured by the microphone to the remote computer server system.

7. The method for alerting the user to household environmental sounds of claim 1, wherein receiving the sound profile comprises:

receiving, by the television receiver from the remote computer server system, via a broadcast of a satellite-based television distribution network, a plurality of sound profiles, wherein each sound profile comprises a corresponding message and a corresponding acoustic signature, the sound profile being part of the plurality of sound profiles.

8. The method for alerting the user to household environmental sounds of claim 1, wherein outputting, by the television receiver, to the television for visual presentation to the user, the message based on the definition from the sound profile identified as the match comprises:

overlaying, by the television receiver, the message from the sound profile over television programming being output to the television for presentation.

9. The method for alerting the user to household environmental sounds of claim 1, wherein outputting, by the television receiver, to the television for visual presentation to the user, the message based on the definition from the sound profile identified as the match comprises:

storing an indication of the sound profile having been matched;

determining, by the television receiver, that the television receiver has been turned on for viewing of television programming; and in response to the television receiver having been turned on for viewing of the television programming, outputting, by the television receiver, to the television, the definition from the sound profile identified as the match based on the stored indication of the sound profile.

10. The method for alerting the user to household environmental sounds of claim 1, further comprising:

maintaining, by the remote computer server system, a database of sound profiles storing a plurality of sound profiles, wherein one or more sound profiles of the plurality of sound profiles are based on definitions of sounds received from a plurality of television receivers.

11. A system for alerting a user to household environmental sounds, the system comprising:

a plurality of microphones within a household, the plurality of microphones configured for wireless communication;

a television receiver, configured to:

output a questionnaire that requests a make of an appliance and a location of each of the plurality of microphones within the household;

receive, in response to the questionnaire, an indication of the make of the appliance and an indication of the location of each of the plurality of microphones within the household;

receive a sound profile, from a remote computer server system, that corresponds to the make of the appliance received in response to the questionnaire, wherein the sound profile comprises: a definition associated with a sound and an acoustic signature;

receive data representative of a sound captured by a microphone of the plurality of microphones, wherein the microphone of the plurality of microphones is remotely located from the television receiver;

identify a match, having at least a threshold level of confidence, between the data representative of the sound captured by the microphone and the sound profile; and output, to a television, for visual presentation, a message based on the definition from the sound profile identified as the match, wherein the message indicates the location of the microphone which captured the sound or the location of the appliance.

12. The system for alerting the user to household environmental sounds of claim 11, wherein the television receiver is further configured to:

transmit, to the remote computer server system, at least a portion of the data representative of the sound captured by the microphone, wherein identifying the match is performed by the remote computer server system.

13. The system for alerting the user to household environmental sounds of claim 11, wherein the television receiver is further configured to:

determine that data representative of a second sound captured by a microphone of the plurality of microphones does not match, within the threshold level of confidence, any sound profile of a plurality of local sound profiles stored by the television receiver; and in response to determining that the data representative of the second sound captured by microphone does not match any sound profile of the plurality of local sound profiles, transmit, to the remote computer server system, at least the portion of the data representative of the second sound captured by the microphone.

14. The system for alerting the user to household environmental sounds of claim 11, wherein the television receiver is further configured to:

create a timestamp indicative of a time at which the sound was captured by the microphone; and output, for presentation to the user, the timestamp concurrently with the message.

15. The system for alerting the user to household environmental sounds of claim 11, wherein the television receiver is further configured to:

create, over time, a background model for an environment of the household, the background model being representative of background noise;

compare, the data representative of the sound captured by the microphone with the background model; and subtract the background model from the data representative of the sound captured by the microphone prior to identifying the match.

16. The system for alerting the user to household environmental sounds of claim 11, wherein the television receiver is further configured to:

receive, from a microphone of the plurality of microphones, data representative of a second sound captured by the microphone;

determine that the remote computer server system does not store any sound profile that matches the second sound;

in response to determining that the remote computer server system does not have a sound profile that matches the second sound, output, for presentation to the user, an interface to allow the user to identify the second sound;

while presenting the interface, output a recording of the second sound;

receive a second definition of the second sound from the user; and transmit the second definition of the second sound and at least a portion of the data representative of the second sound captured by the microphone to the remote computer server system.

17. The system for alerting the user to household environmental sounds of claim 11, wherein the television receiver comprises a tuner and the television receiver being configured to receive the sound profile comprises:

the television receiver being configured to receive, from the remote computer server system, via the tuner from a television distribution network, a plurality of sound profiles, wherein each sound profile comprises a corresponding message and a corresponding acoustic signature, the sound profile being part of the plurality of sound profiles.

18. The system for alerting the user to household environmental sounds of claim 11, wherein the television receiver being configured to output, to the television, for visual presentation to the user, the message based on the definition from the sound profile identified as the match comprises the television receiver being configured to:

overlay the message from the sound profile over television programming being output to the television for presentation.

19. The system for alerting the user to household environmental sounds of claim 11, wherein the television receiver being configured to output, to the television, for visual presentation to the user, the message based on the definition from the sound profile identified as the match comprises the television receiver being configured to:

store an indication of the sound profile having been matched;

determine that the television receiver has been turned on for viewing of television programming; and in response to the television receiver having been turned on for viewing of the television programming, output, to the television, the definition from the sound profile identified as the match based on the stored indication of the sound profile.

20. A non-transitory processor-readable medium for alerting a user to household environmental sounds, comprising processor-readable instructions configured to cause one or more processors to:

output a questionnaire that requests a make of an appliance and a location of each of a plurality of microphones within a household;

receive, in response to the questionnaire, an indication of the make of the appliance and an indication of the location of each of the plurality of microphones within the household;

receive a sound profile, from a remote computer server system, that corresponds to the appliance, wherein the sound profile comprises: a definition associated with a sound and an acoustic signature;

receive data representative of a sound captured by a microphone, wherein the microphone of the plurality of microphones within the household is remotely located from a television receiver executing the processor-readable instructions;

identify a match, having at least a threshold level of confidence, between the data representative of the sound captured by the microphone and the sound profile; and output, by the television receiver, to a television, for visual presentation, a message based on the definition from the sound profile identified as the match, wherein the message indicates the location of the microphone which captured the sound or the location of the appliance.

* * * * *